United States Patent
Fang et al.

(10) Patent No.: US 11,205,129 B2
(45) Date of Patent: Dec. 21, 2021

(54) GBDT MODEL FEATURE INTERPRETATION METHOD AND APPARATUS

(71) Applicant: Advanced New Technologies Co., Ltd., George Town (KY)

(72) Inventors: Wenjing Fang, Hangzhou (CN); Jun Zhou, Hangzhou (CN); Licui Gao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 3 days.

(21) Appl. No.: 16/889,695

(22) Filed: Jun. 1, 2020

(65) Prior Publication Data

US 2020/0293924 A1  Sep. 17, 2020

Related U.S. Application Data

(63) Continuation of application No. PCT/CN2019/076264, filed on Feb. 27, 2019.

(30) Foreign Application Priority Data

May 21, 2018 (CN) .................. 201810488062.X (51) Int. Cl.
  *G06N 5/04* (2006.01)
  *G06N 20/20* (2019.01)
  (Continued)

(52) U.S. Cl.
  CPC ............. *G06N 5/04* (2013.01); *G06N 5/003* (2013.01); *G06N 20/00* (2019.01); *G06N 20/20* (2019.01)

(58) Field of Classification Search
  CPC ........... G06N 5/04; G06N 20/20; G06N 5/003
  See application file for complete search history.

(56) References Cited

U.S. PATENT DOCUMENTS

| 2012/0005204 A1 | 1/2012 | Diaz et al. |
| 2017/0213280 A1 | 7/2017 | Kaznady |

FOREIGN PATENT DOCUMENTS

| CN | 106204063 | 12/2016 |
| CN | 106250403 | 12/2016 |

(Continued)

OTHER PUBLICATIONS

Yang, Chengliang, et al. "Predicting 30-day all-cause readmissions from hospital inpatient discharge data." 2016 IEEE 18th International conference on e-Health networking, applications and services (Healthcom). IEEE, 2016. (Year: 2016).*

(Continued)

*Primary Examiner* — Luis A Sitiriche
*Assistant Examiner* — Sehwan Kim
(74) *Attorney, Agent, or Firm* — Fish & Richardson P.C.

(57) ABSTRACT

Implementations of the present specification disclose methods, devices, and apparatuses for determining a feature interpretation of a predicted label value of a user generated by a GBDT model. In one aspect, the method includes separately obtaining, from each of a predetermined quantity of decision trees ranked among top decision trees, a leaf node and a score of the leaf node; determining a respective prediction path of each leaf node; obtaining, for each parent node on each prediction path, a split feature and a score of the parent node; determining, for each child node on each prediction path, a feature corresponding to the child node and a local increment of the feature on the child node; obtaining a collection of features respectively corresponding to the child nodes; and obtaining a respective measure of relevance between the feature corresponding to the at least one child node and the predicted label value.

14 Claims, 4 Drawing Sheets

(51) Int. Cl.
G06N 5/00 (2006.01)
G06N 20/00 (2019.01)

(56) References Cited

FOREIGN PATENT DOCUMENTS

| | | |
|---|---|---|
| CN | 106611191 | 5/2017 |
| CN | 107025154 | 8/2017 |
| CN | 107153977 | 9/2017 |
| CN | 107301577 | 10/2017 |
| CN | 108681750 | 10/2018 |

OTHER PUBLICATIONS

Palczewska, Anna, et al. "Interpreting random forest models using a feature contribution method." 2013 IEEE 14th International Conference on Information Reuse & Integration (IRI). IEEE, 2013. (Year: 2013).*

Li, Fulu, and Andrew Lippman. "Random tree optimization for the construction of the most parsimonious phylogenetic trees." 2009 43rd Annual Conference on Information Sciences and Systems. IEEE, 2009. (Year: 2009).*

Yan-Wen, W. U., et al. "Application of improved SPRINT algorithm in the graduation design process management system." Workshop on Intelligent Information Technology Application (IITA 2007). IEEE, 2007. (Year: 2007).*

Ke, Guolin, et al. "Lightgbm: A highly efficient gradient boosting decision tree." Advances in neural information processing systems 30 (2017): 3146-3154. (Year: 2017).*

Liu, Liangliang, et al. "An interpretable model for predicting side effects of analgesics for osteoarthritis." 2017 IEEE International Conference on Bioinformatics and Biomedicine (BIBM). IEEE, 2017. (Year: 2017).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/076264, dated May 29, 2019, 10 pages (with partial English translation).

EP Extended Search Report in European Application No. 19806892.6, dated Feb. 16, 2021, 7 pages.

Li et al, "Transaction Fraud Detection Using GRU-Centered Sandwich-Structured Model," 2018 IEEE 22nd International Conference on Computer Supported Cooperative Work In Design, IEEE, May 9, 2018, 6 pages.

Chen et al, "An Unbalanced Data Hybrid-Sampling Algorithm Based on Multi-Information Fusion," 2017 IEEE Global Communications Conference, IEEE, Dec. 4, 2017, 7 pages.

* cited by examiner

GBDT MODEL FEATURE INTERPRETATION METHOD AND APPARATUS

CROSS-REFERENCE TO RELATED APPLICATIONS

This application is a continuation of PCT Application No. PCT/CN2019/076264, filed on Feb. 27, 2019, which claims priority to Chinese Patent Application No. 201810488062.X, filed on May 21, 2018, and each application is hereby incorporated by reference in its entirety.

TECHNICAL FIELD

Implementations of the present specification relate to the field of data processing technologies, and more specifically, to methods and apparatuses for determining feature interpretations of predicted labels of users.

BACKGROUND

With rapid development of Internet technologies, data mining on the Internet becomes increasingly important. Generally, in data mining, modeling is performed based on labeled data though machine learning, so that a trained model can be used to process data to be predicted. In many machine learning algorithms, the gradient boosting decision tree (GBDT) algorithm is more and more widely applied because of its excellent learning performance. The GBDT algorithm is a machine learning technology that is used for tasks such as regression, classification, and sorting. The GBDT algorithm combines multiple weak learners (usually decision trees) to obtain a strong prediction model. The GBDT model is iterated multiple times, and in each iteration, a loss function is reduced in a gradient direction to obtain multiple decision trees. With the extensive application of the GBDT algorithm, increasing needs for interpreting the GBDT model are generated. In addition to feature importance parameters that are currently commonly used as global interpretations, interpretation of a local feature contribution for a single user mainly includes the following two methods: extracting a preferred solution from the GBDT model through remodeling for interpretation; and adjusting an eigenvalue size to test impact of the feature on a prediction performance loss.

SUMMARY

Implementations of the present specification are intended to provide a more effective GBDT model interpretation solution to reduce issues in the existing technology.

To achieve the objective above, according to an aspect of the present specification, a method for determining a feature interpretation of a predicted label value of a user is provided. The method is performed after a prediction of a label value of the user is generated by using a GBDT model. The feature interpretation includes multiple features of the user that are relevant to the predicted label value of the user and a respective measure of relevance between each of the features and the predicted label value. The GBDT model includes multiple decision trees arranged in a predetermined order. The method includes the following: separately obtaining, from a predetermined quantity of decision trees that are ranked among the top decision trees in the predetermined order, a leaf node including the user and a score of the leaf node, where the score of the leaf node is a score predetermined by using the GBDT model; determining a respective prediction path of each leaf node, where the prediction path is a node connection path from the leaf node to a root node of a decision tree in which the leaf node is located; obtaining a split feature and a score of each parent node on each prediction path, where the score of the parent node is determined based on predetermined scores of leaf nodes of a decision tree in which the parent node is located; determining, for each child node on each prediction path based on a score of the child node and a score and a split feature of a parent node of the child node, a feature corresponding to the child node and a local increment of the feature on the child node, where the feature corresponding to the child node is a feature relevant to the predicted label value of the user; obtaining a collection of features respectively corresponding to all child nodes as the multiple features relevant to the predicted label value of the user; and obtaining, by computing a sum of a local increment of the feature of at least one of the child nodes that corresponds to a same feature, a measure of relevance between the feature corresponding to the at least one child node and the predicted label value.

In an implementation, in the method for determining a feature interpretation of a predicted label value of a user, the score of the parent node is determined based on the predetermined scores of the leaf nodes of the decision tree in which the parent node is located. The score of the parent node is an average value of scores of two child nodes of the parent node.

In an implementation, in the method for determining a feature interpretation of a predicted label value of a user, the score of the parent node is determined based on the predetermined scores of the leaf nodes of the decision tree in which the parent node is located. The score of the parent node is a weighted average value of scores of two child nodes of the parent node, and weights of the scores of the child nodes are determined based on quantities of samples respectively allocated to the child nodes in a training process of the GBDT model.

In an implementation, in the method for determining a feature interpretation of a predicted label value of a user, the determining a feature corresponding to the child node and a local increment of the feature on the child node includes the following: obtaining a difference between the score of the child node and the score of the parent node as the local increment of the feature.

In an implementation, in the method for determining a feature interpretation of a predicted label value of a user, the GBDT model is a classification model or a regression model.

In an implementation, in the method for determining a feature interpretation of a predicted label value of a user, the predetermined quantity of decision trees that are ranked among the top decision trees in the predetermined order include multiple decision trees that are included in the GBDT model and that are arranged in a predetermined order.

According to another aspect of the present specification, an apparatus for determining a feature interpretation of a predicted label value of a user is provided. The apparatus is implemented after a prediction of a label value of the user is generated by using a GBDT model. The feature interpretation includes multiple features of the user that are relevant to the predicted label value of the user and a respective measure of relevance between each of the features and the predicted label value. The GBDT model includes multiple decision trees arranged in a predetermined order. The apparatus includes the following: a first acquisition unit, configured to separately obtain, from a predetermined quantity of decision trees ranked among the top decision trees, a leaf node including the user and a score of the leaf node, where the score of the leaf node is a score predetermined by using the GBDT model; a first determining unit, configured to determine a respective prediction path of each leaf node, where the prediction path is a node connection path from the leaf node to a root node of a decision tree in which the leaf node is located; a second acquisition unit, configured to obtain a split feature and a score of each parent node on each prediction path, where the score of the parent node is determined based on predetermined scores of leaf nodes of a decision tree in which the parent node is located; a second determining unit, configured to determine, for each child node on each prediction path based on a score of the child node and a score and a split feature of a parent node of the child node, a feature corresponding to the child node and a local increment of the feature on the child node, where the feature corresponding to the child node is a feature relevant to the predicted label value of the user; a feature acquisition unit, configured to obtain a collection of features respectively corresponding to all child nodes as the multiple features relevant to the predicted label value of the user; and a relevance determination unit, configured to obtain, by computing a sum of a local increment of the feature of at least one of the child nodes that corresponds to a same feature, a respective measure of relevance between the feature corresponding to the at least one child node and the predicted label value.

According to the GBDT model interpretation solution of the implementations of the present specification, high quality user-level model interpretation of the GBDT model can be obtained by obtaining merely existing parameters and prediction results in the GBDT model, and a computation cost is relatively low. In addition, the solution in the implementations of the present specification is applicable to various GBDT models, and features high applicability and high operability.

BRIEF DESCRIPTION OF DRAWINGS

The implementations of the present specification are described with reference to the accompanying drawings so that the implementations of the present specification can be clearer.

DESCRIPTION OF IMPLEMENTATIONS

The following describes the implementations of the present specification with reference to the accompanying drawings.

An application scenario of the implementations of the present specification is first described. A model interpretation method according to the implementations of the present specification is performed after a prediction of a label value of a user is generated by using a GBDT model. The GBDT model is obtained by training through the following training process: A training set $D1=\{x^{(i)}, y^{(i)}\}_{i=1}^{N}$ is first obtained, where N is a quantity of training samples, that is, a quantity of users. $x^{(i)}$ is a feature vector of the ith user, and the feature vector is, for example, an S-dimensional vector, that is, $x=(x_1, x_2, \ldots, x_s)$. $y^{(i)}$ is a known label value of the ith user. For example, the GBDT model is a model for predicting credit card frauds. Therefore, $x^{(i)}$ can be a user's credit card record data, transaction record data, etc., and $y^{(i)}$ can be the user's fraud risk value. Then, the N users can be divided through a first decision tree. To be specific, a split feature and a feature threshold are set on each parent node of the decision tree, and features and feature thresholds corresponding to users are compared on the parent node so as to divide and allocate the users to corresponding child nodes. Through such a process, the N users can finally be divided and allocated to leaf nodes. A score of each leaf node is an average value of label values (namely, $y^{(i)}$) of users on the leaf node.

After the first decision tree is obtained, a residual $r^{(i)}$ of each user can be obtained by subtracting a known label value of the user from a score of the user's leaf node in the first decision tree. $D2=\{x^{(i)}, r^{(i)}\}_{i=1}^{N}$ is used as a new training set, which corresponds to a same user set as D1. A second decision tree can be obtained in the same way as above. In the second decision tree, the N users are divided and allocated to leaf nodes, and a score of each leaf node is an average value of residual values of users. Similarly, multiple decision trees can be obtained in a predetermined order, and each decision tree is obtained based on residuals of the previous decision tree. Therefore, a GBDT model including multiple decision trees can be obtained.

During prediction of a user's label value, a feature vector of the user is input to the GBDT model, and each decision tree in the GBDT model allocates the user to a corresponding leaf node based on a split feature and a split threshold of a parent node in the decision tree, so as to obtain a predicted label value of the user by computing a sum of scores of leaf nodes in which the user is located.

After the previous prediction process, a feature interpretation of the predicted label value of the user can be obtained based on existing parameters and a prediction result in the GBDT model according to the model interpretation method in the implementations of the present specification. That is, from the decision trees, a leaf node in which the user is located is obtained, a prediction path including the leaf node is obtained; a feature, of a child node on the prediction path, relevant to the predicted label value and a local increment of the feature are calculated; and local increments of a same feature that are included in all the decision trees are accumulated as a measure of relevance between the feature and the predicted label value, that is, a feature contribution of the feature to the predicted label value. As such, feature interpretation is performed on the predicted label value of the user by using the feature and its feature contribution. The previous GBDT model is a regression model, that is, a label predicted by the GBDT model is a continuous value, for example, a fraud risk value, an age, etc. However, the GBDT model is not limited to a regression model, and can further be a classification model, a recommendation model, etc. These models each can use the GBDT model interpretation method according to the implementations of the present specification.

Figure 1:
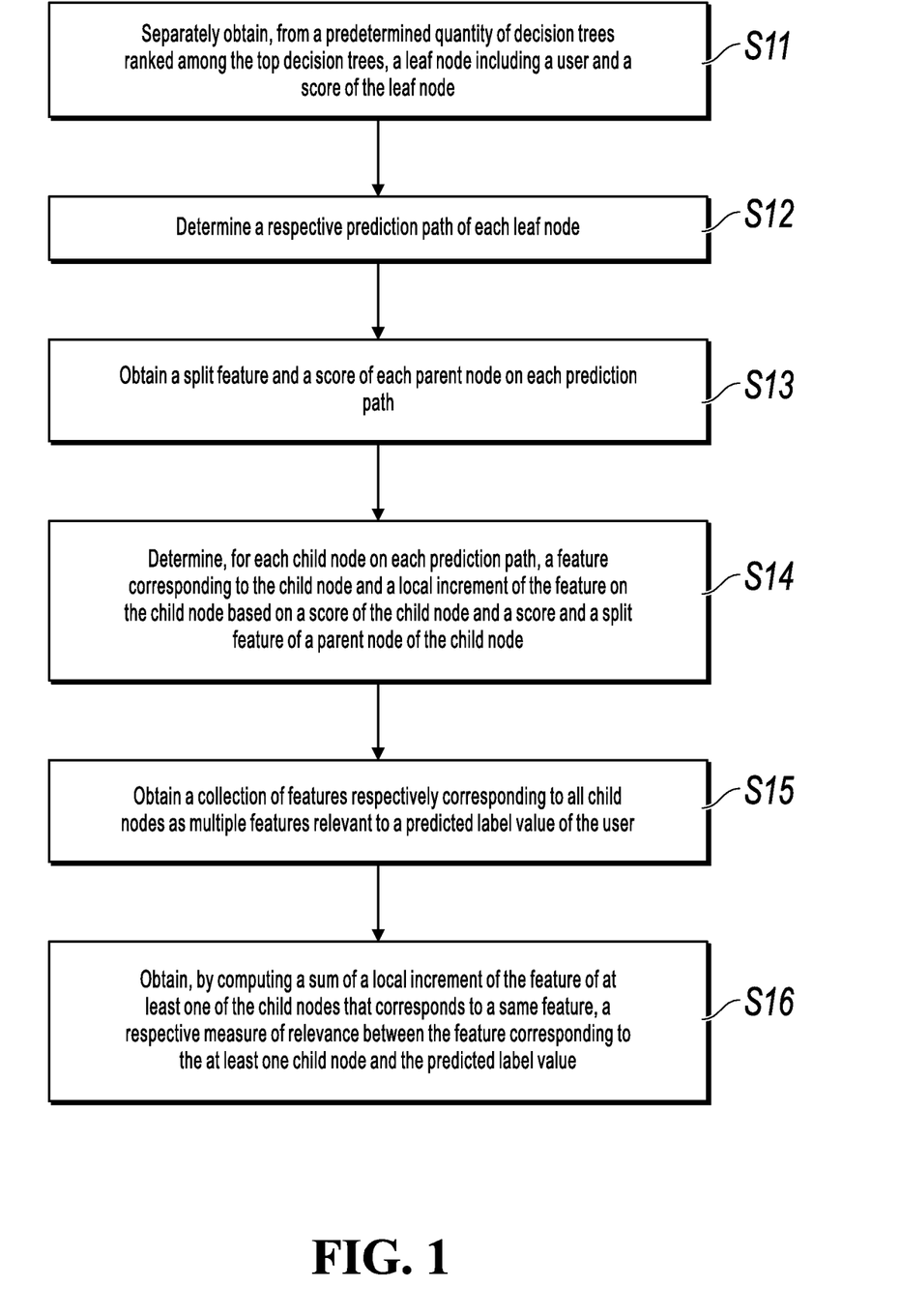
FIG. 1 illustrates a method for determining a feature interpretation of a predicted label value of a user, according to an implementation of the present specification.

FIG. 1 illustrates a method for determining a feature interpretation of a predicted label value of a user, according to an implementation of the present specification. The method is performed after a prediction of a label value of the user is generated by using a GBDT model. The feature interpretation includes multiple features of the user that are relevant to the predicted label value of the user and a respective measure of relevance between each of the features and the predicted label value. The GBDT model includes multiple decision trees arranged in a predetermined order. The method includes the following steps: At step S11, from a predetermined quantity of decision trees ranked among the top decision trees, a leaf node including the user and a score of the leaf node are separately obtained, where the score of the leaf node is a score predetermined by using the GBDT model. At step S12, a respective prediction path of each leaf node is determined, where the prediction path is a node connection path from the leaf node to a root node of a decision tree in which the leaf node is located. At step S13, a split feature and a score of each parent node on each prediction path are obtained, where the score of the parent node is determined based on predetermined scores of leaf nodes of a decision tree in which the parent node is located. At step S14, for each child node on each prediction path, a feature corresponding to the child node and a local increment of the feature on the child node are determined based on a score of the child node and a score and a split feature of a parent node of the child node, where the feature corresponding to the child node is a feature relevant to the predicted label value of the user. At step S15, a collection of features respectively corresponding to all child nodes is obtained as the multiple features relevant to the predicted label value of the user. At step S16, by computing a sum of a local increment of the feature of at least one of the child nodes that corresponds to a same feature, a respective measure of relevance between the feature corresponding to the at least one child node and the predicted label value is obtained.

First, at step S11, from the predetermined quantity of decision trees ranked among the top decision trees, the leaf node including the user and the score of the leaf node are separately obtained, where the score of the leaf node is a score predetermined by using the GBDT model.

As described above, in the multiple decision trees that are included in the GBDT model, each decision tree is obtained based on a label value residual of its previous decision tree, that is, a score of a leaf node of each of the decision trees becomes increasingly small. Accordingly, a local increment of a user feature that is relevant to the user's predicted label value and that is determined by using each of the decision trees arranged in the predetermined order also becomes orders of magnitude smaller. It can be predicted that, a local increment of a feature obtained from a decision tree ranked behind has increasingly small impact on a measure of relevance of the feature to the predicted label value (that is, a sum of all local increments of the feature), and the impact can even be approximately zero. Therefore, the predetermined quantity of decision trees ranked among the top decision trees can be selected to implement the method according to the implementations of the present specification. The predetermined quantity can be determined by using a predetermined condition. For example, the predetermined quantity can be determined based on an order of magnitude of leaf nodes, or based on a predetermined decision tree percentage. In an implementation, the method according to the implementations of the present specification can be implemented for all the decision trees that are included in the GBDT model to obtain accurate model interpretations.

Figure 2:
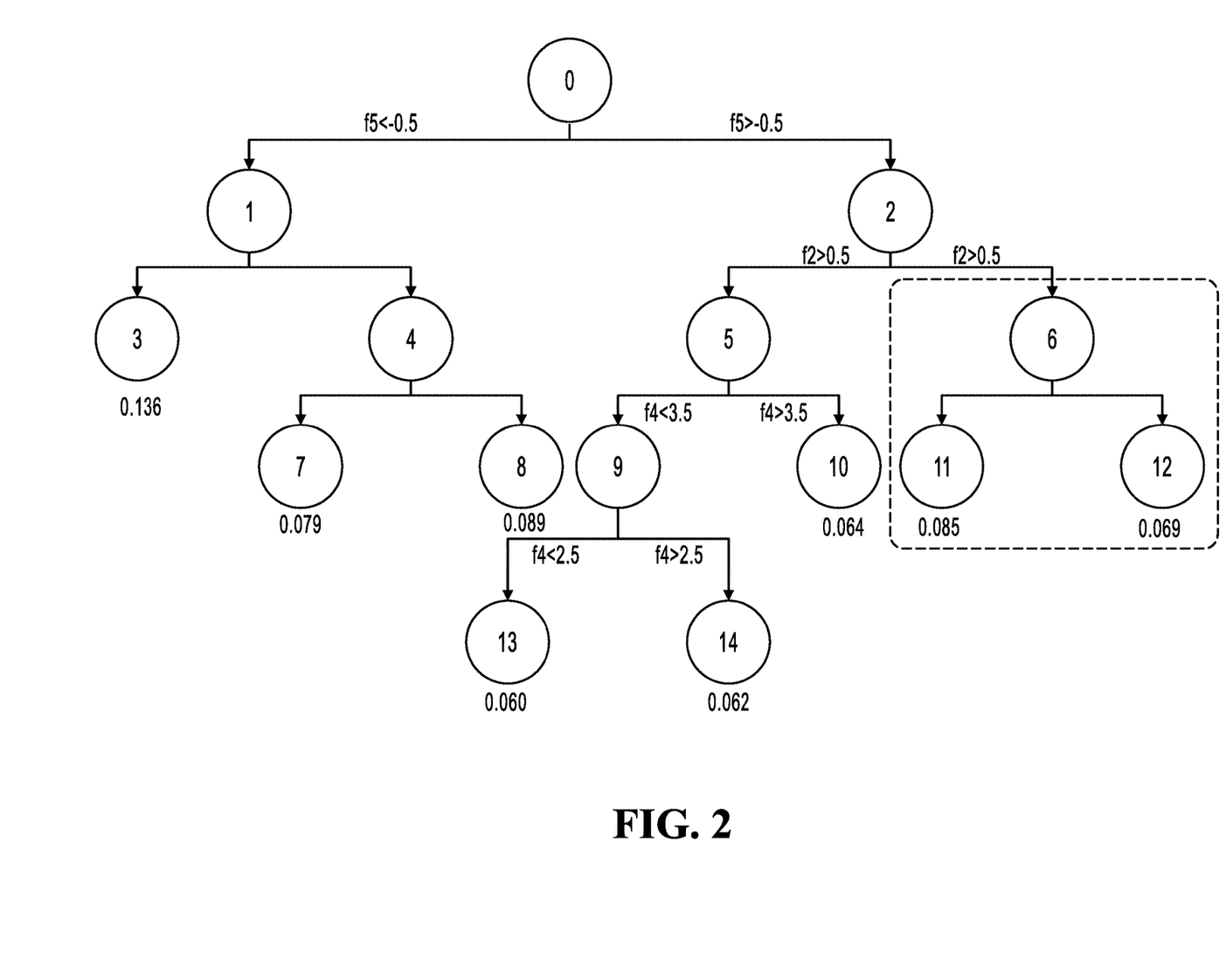
FIG. 2 illustrates a decision tree included in a GBDT model, according to an implementation of the present specification.

FIG. 2 illustrates a decision tree that is included in the GBDT model, according to an implementation of the present specification. As shown in FIG. 2, a node denoted by 0 in the figure is a root node of the decision tree, and nodes denoted by 3, 7, 8, 13, 14, 10, 11, and 12 in the figure are leaf nodes of the decision tree. A value depicted under each leaf node (for example, 0.136 under node 3) is a score of the leaf node, and the score is determined by the GBDT model in training based on known label values of multiple samples allocated to the leaf nodes. As shown in the rectangular dashed-line box in FIG. 2, two nodes 11 and 12 are divided from node 6. Therefore, node 6 is a parent node of node 11 and node 12, and both node 11 and node 12 are child nodes of node 6. As shown in FIG. 2, features and value ranges are depicted over arrows from some parent nodes to child nodes in the figure. For example, "f5≤−0.5" is depicted over an arrow from node 0 to node 1, and "f5>−0.5" is depicted over an arrow from node 0 to node 2. Here, f5 represents feature 5, which is a split feature of node 0, and −0.5 is a split threshold of node 0.

Figure 3:
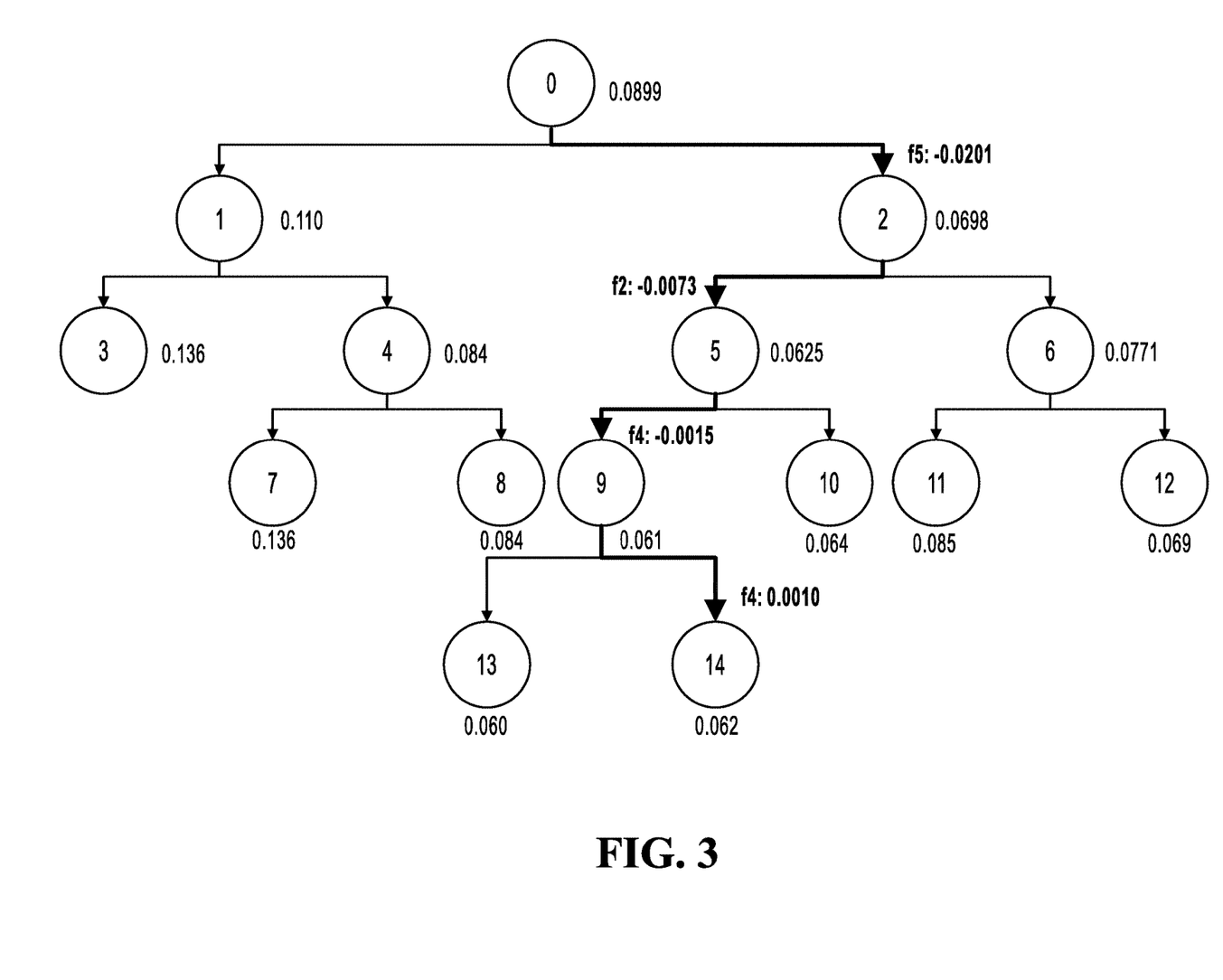
FIG. 3 is a schematic diagram illustrating implementation of a method according to an implementation of the present specification based on the decision tree illustrated in FIG. 2.

FIG. 3 is a schematic diagram illustrating implementation of a method in an implementation of the present specification based on the decision tree illustrated in FIG. 2. As shown in FIG. 3, when a prediction of a user's label value is generated by using a GBDT model including the decision tree shown in FIG. 3, assuming that the user is allocated to node 14 in the decision tree, node 14 including the user and a score of node 14 can be determined from the decision tree. In addition, in another decision tree that is included in the GBDT model, a leaf node in which the user is located and a score of the leaf node can be similarly determined. Therefore, a predetermined quantity of leaf nodes and their corresponding scores can be obtained, that is, one leaf node can be obtained from each of the predetermined quantity of decision trees.

At step S12, a respective prediction path of each leaf node is determined, where the prediction path is a node connection path from the leaf node to the root node of the decision tree in which the leaf node is located. Referring back to FIG. 3, in the decision tree shown in FIG. 3, after leaf node 14 in which the user is located is determined, it can be determined that the prediction path is a prediction path from node 0 to node 14 in the figure, and the prediction path is indicated by a node connection path connected by using bold arrows in the figure. In addition, in another decision tree in the predetermined quantity of decision trees, a prediction path can be similarly obtained, so as to obtain a predetermined quantity of prediction paths.

At step S13, the split feature and the score of each parent node on each prediction path are obtained, where the score of the parent node is determined based on the predetermined scores of the leaf nodes of the decision tree in which the parent node is located. Referring to FIG. 3, on the prediction path from node 0 to node 14, each node except node 14 has a child node, that is, parent nodes on this path include node 0, node 2, node 5, and node 9. As described above with reference to FIG. 2, a split feature of a parent node can be directly obtained from a decision tree. For example, referring to FIG. 2, it can be determined that a split feature of node 0 is feature 5, a split feature of node 2 is feature 2, a split feature of node 5 is feature 4, and a split feature of node 9 is feature 4. In an implementation, the score of the parent node can be determined based on the following equation (1):

$$S_p = \tfrac{1}{2}(S_{c1} + S_{c2}) \tag{1}$$

$S_p$ is the score of the parent node, and $S_{c1}$ and $S_{c2}$ are scores of two child nodes of the parent node. That is, the score of the parent node is an average value of the scores of its two child nodes. For example, as shown in FIG. 3, based on scores of node 13 and node 14, it can be determined that a score of node 9 is ½(0.06+0.062)=0.061. Similarly, based on scores of node 9 and node 10, it can be determined that a score of node 5 is 0.0625; based on score of node 5 and node 6, it can be determined that a score of node 2 is 0.0698; and based on score of node 1 and node 2, it can be determined that a score of node 0 is 0.0899. It can be understood that, a score of each parent node on the prediction path shown in FIG. 3 can be determined based on scores of leaf nodes in the figure. For example, the score of node 5 can be determined based on scores of nodes 13, 14, and 10, and the score of node 2 can be determined based on scores of nodes 13, 14, 10, 11, and 12.

In an implementation, the score of the parent node can be determined based on the following equation (2):

$$S_p = \frac{N_{C1} \times S_{C1} + N_{C2} \times S_{C2}}{N_{C1} + N_{C2}} \quad (2)$$

$N_{c1}$ and $N_{c2}$ are quantities of samples that are respectively allocated to child nodes c1 and c2 in model training. That is, the score of the parent node is a weighted average value of scores of two child nodes of the parent node, and weights of the two child nodes are quantities of samples that are allocated to the two child nodes in the model training process. In actual applications or experimental tests according to the implementations of the present specification, it can be determined that a higher quality model interpretation can be obtained by using the score of the parent node determined by using equation (2) than the score of the parent node determined by using equation (1). In addition, in the implementations of the present specification, calculation of the parent node is not limited to previous equations (1) and (2). For example, parameters in equations (1) and (2) can be adjusted, so that a model interpretation can be more accurate. Moreover, the score of each parent node can be obtained based on scores of leaf nodes by using a geometric average value, a root mean square value, etc.

At step S14, for each child node on each prediction path, the feature corresponding to the child node and the local increment of the feature on the child node are determined based on the score of the child node and the score and the split feature of the parent node of the child node, where the feature corresponding to the child node is a feature relevant to the predicted label value of the user.

Referring to FIG. 3, on the prediction path from node 0 to node 14, all nodes except root node 0 are child nodes of previous nodes, that is, child nodes on the path include node 2, node 5, node 9, and node 14. A child node on the prediction path can be obtained only through feature splitting on a parent node on the prediction path. Therefore, a split feature of the parent node is a feature relevant to a predicted label value of the child node. For ease of description, the split feature is described as a feature corresponding to the child node or a contributing feature on the child node. For example, as shown in FIG. 3, a feature corresponding to node 2 is feature 5, a feature corresponding to node 5 is feature 2, a feature corresponding to node 9 is feature 4, and a feature corresponding to node 14 is feature 4.

In an implementation, a local increment of the feature on each child node can be obtained by using the following equation (3):

$$LI_c^f = S_c - S_p \quad (3)$$

$LI_c^f$ represents a local increment of feature f on child node c, $S_c$ represents a score of the child node, and $S_p$ represents a score of a parent node of the child node. The equation can be verified from actual applications or experimental tests.

By using equation (3), based on the score of each parent node obtained in step S13, it can be easily obtained through calculation that a local increment of feature 5 (f5) on node 2 is −0.0201 (that is, 0.0698−0.0899), a local increment of feature 2 (f2) on node 5 is −0.0073, a local increment of feature 4 (f4) on node 9 is −0.0015, and a local increment of feature 4 (f4) on node 14 is 0.001.

In the implementations of the present specification, calculation of the local increment is not limited to previous equation (3), and the local increment can be further calculated by using another calculation method. For example, the score of the parent node or the score of the child node in equation (3) can be multiplied by a correction parameter to make the model interpretation more accurate.

At step S15, the collection of features respectively corresponding to all the child nodes is obtained as the multiple features relevant to the predicted label value of the user. For example, referring to FIG. 3, in the decision tree shown in FIG. 3, features relevant to the predicted label value of the user, namely, feature 5, feature 2, and feature 4, can be obtained from the prediction path. Similarly, features relevant to the predicted label value of the user can be similarly obtained from other decision trees in the predetermined quantity of decision trees. These features are grouped together to obtain a collection of multiple features relevant to the predicted label value of the user.

At step S16, by computing a sum of a local increment of the feature of at least one of the child nodes that corresponds to a same feature, a respective measure of relevance between the feature corresponding to the at least one child node and the predicted label value is obtained. For example, in the decision tree shown in FIG. 3, nodes 9 and 14 on the prediction path both correspond to feature 4, and therefore, a sum of the local increments on nodes 9 and 14 can be computed. For example, when no prediction path child node corresponding to feature 4 can be obtained in the other decision trees, a measure of relevance (or a feature contribution value) between feature 4 and the predicted label value can be obtained, which is −0.0015+0.0010=0.0025. When another decision tree also includes a prediction path child node corresponding to feature 4, a sum of local increments of all child nodes corresponding to feature 4 can be computed, so as to obtain a measure of relevance or a contribution value of feature 4. A larger relevance value indicates a higher measure of relevance between the feature and the predicted label value. When a relevance value is negative, it indicates that the measure of relevance between the feature and the predicted label value is very low. For example, in an instance of generating a prediction of a credit card fraud value of a user by using a GBDT model, a larger relevance value indicates a higher measure of relevance between the feature and the credit card fraud value, that is, the feature has a greater risk.

By obtaining multiple features relevant to the predicted label value of the user and the respective measures of relevance between the multiple features and the predicted label value, feature interpretation can be performed on the predicted label value of the user, so as to clarify a prediction determining factor. In addition, more information related to the user can be obtained through the feature interpretation. For example, in an instance of generating a prediction of a credit card fraud value of a user by using a GBDT model, by obtaining multiple features relevant to a predicted label value of the user and respective relevance values of the features, an impact aspect of the feature and a relevance value of the feature can be used as reference information for a predicted credit card fraud value of the user, so that judgment of the user is more accurate.

Figure 4:
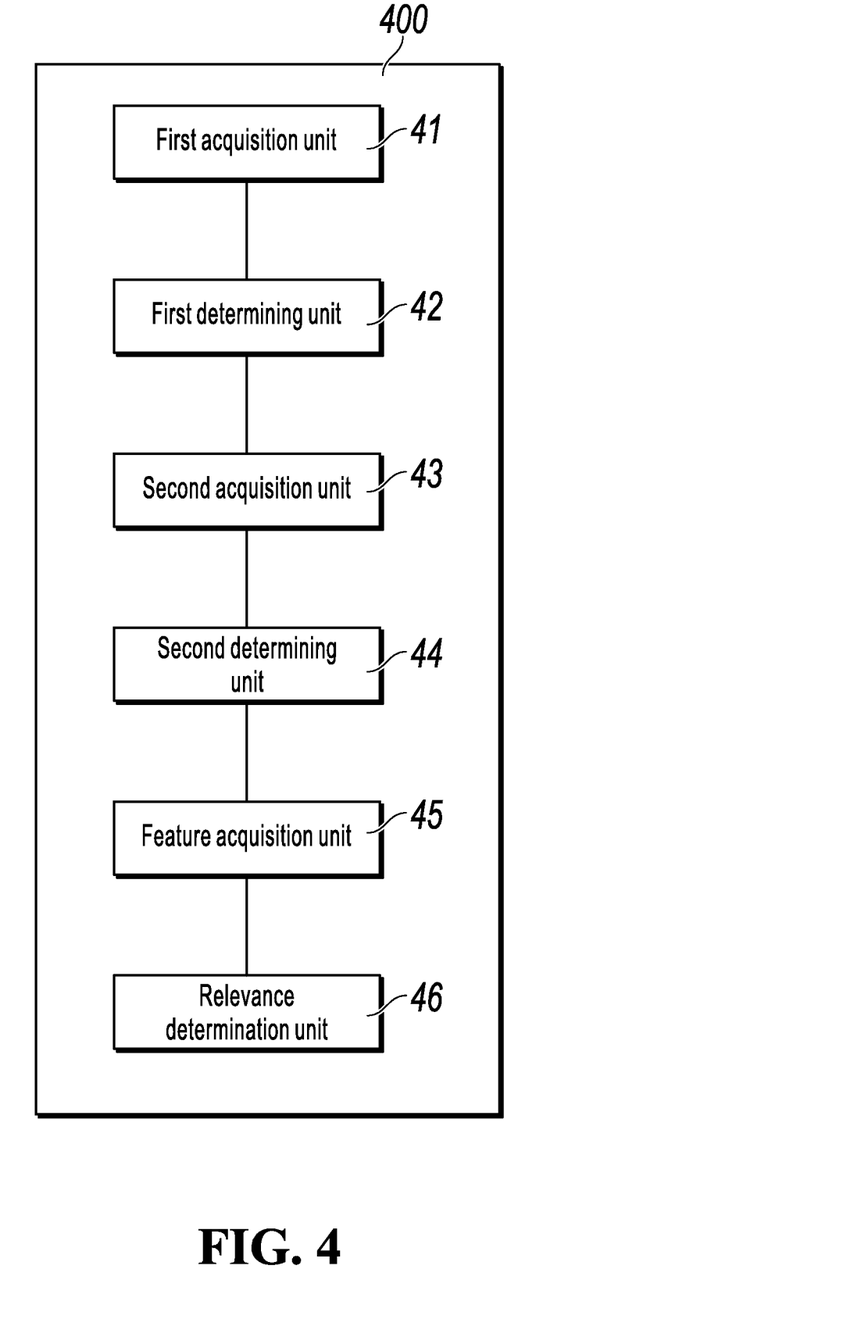
FIG. 4 illustrates an apparatus 400 for obtaining a feature interpretation of a predicted label value of a user, according to an implementation of the present specification.

FIG. 4 illustrates an apparatus 400 for obtaining a feature interpretation of a predicted label value of a user, according to an implementation of the present specification. The apparatus 400 is implemented after a prediction of a label value of the user is generated by using a GBDT model. The feature interpretation includes multiple features of the user that are relevant to the predicted label value of the user and a respective measure of relevance between each of the features and the predicted label value. The GBDT model includes multiple decision trees arranged in a predetermined order. The apparatus 400 includes the following: a first acquisition unit 41, configured to separately obtain, from a predetermined quantity of decision trees ranked among the top decision trees, a leaf node including the user and a score of the leaf node, where the score of the leaf node is a score predetermined by using the GBDT model; a first determining unit 42, configured to determine a respective prediction path of each leaf node, where the prediction path is a node connection path from the leaf node to a root node of a decision tree in which the leaf node is located; a second acquisition unit 43, configured to obtain a split feature and a score of each parent node on each prediction path, where the score of the parent node is determined based on predetermined scores of leaf nodes of a decision tree in which the parent node is located; a second determining unit 44, configured to determine, for each child node on each prediction path based on a score of the child node and a score and a split feature of a parent node of the child node, a feature corresponding to the child node and a local increment of the feature on the child node, where the feature corresponding to the child node is a feature relevant to the predicted label value of the user; a feature acquisition unit 45, configured to obtain a collection of features respectively corresponding to all child nodes as the multiple features relevant to the predicted label value of the user; and a relevance determination unit 46, configured to obtain, by computing a sum of a local increment of the feature of at least one of the child nodes that corresponds to a same feature, a respective measure of relevance between the feature corresponding to the at least one child node and the predicted label value.

According to the GBDT model interpretation solution of the implementations of the present specification, a high quality user-level model interpretation of the GBDT model can be obtained by obtaining merely existing parameters and prediction results in the GBDT model, and a computation cost is relatively low. In addition, the solution in the implementations of the present specification is applicable to various GBDT models, and features high applicability and high operability.

A person of ordinary skill in the art can be further aware that, in combination with the examples described in the implementations disclosed in the present specification, units and algorithm steps can be implemented by electronic hardware, computer software, or a combination thereof. To clearly describe interchangeability between the hardware and the software, compositions and steps of each example are generally described above based on functions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementation methods, the objective, technical solutions, and benefits of the present disclosure are further described in detail. It should be understood that the descriptions are merely specific implementation methods of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A computer-implemented method comprising:
generating a predicted label for a user using a gradient boosting decision tree GBDT model, the GBDT model comprising multiple decision trees arranged in a predetermined order;
obtaining, from each of a predetermined quantity of decision trees ranked among top decision trees, (i) a leaf node corresponding to the predicted label generated for the user and (ii) a score of the leaf node that is determined by using the GBDT model;
for each of the predetermined quantity of decision trees ranked among top decision trees:
determining a prediction path of the leaf node obtained from the decision tree, wherein the prediction path includes the leaf node, a root node of the decision tree in which the leaf node is included, and any child node included therealong that is neither the leaf node nor the root node;
computing, for the leaf node, a count of how many training samples for the GBDT model have the predicted label corresponding to the leaf node, wherein the count is dependent on a total quantity of training samples applied during a training process of the GBDT model;
determining, based on the count of training samples, a weight for the score of the leaf node;
determining an estimated score of a parent node of the leaf node based at least on multiplying the weight with the score of the leaf node;
obtaining a split feature corresponding to the parent node of the leaf node;
determining, for the leaf node and based on (i) the score of the leaf node, (ii) the estimated score of the parent node of the leaf node, and (iii) the split feature corresponding to the parent node of the leaf node, a feature corresponding to the leaf node and a local increment of the feature along the path from the parent node of the leaf node to the leaf node;
whenever the parent node is not the root node of the decision tree in which the leaf node is included, using the parent node of the leaf node as a child node and determining, for the child node and based on (i) an estimated score of the child node, (ii) an estimated score of a parent node of the child node, and (iii) a split feature corresponding to the parent node of the child node, a feature corresponding to the child node and a local increment of the feature along the path from the parent node of the child node to the child node; and obtaining a collection of features respectively corresponding to the child nodes including the leaf node as the multiple features relevant to the predicted label value of the user;

determining, from the collection of features that have been obtained for each of the predetermined quantity of decision trees, a set of child nodes that correspond to a same, first feature; and determining, by computing a sum of the local increments of the first feature, a measure of relevance between the first feature and the predicted label for the user.

2. The computer-implemented method of claim 1, further comprising determining the estimated score of the parent node of the leaf node based on:

determining an average value of respective scores of two child nodes of the parent node.

3. The computer-implemented method of claim 1, wherein determining the local increment of the feature along the path from the parent node of the leaf node to the leaf node comprises:

determining a difference between the score of the leaf node and the estimated score of the parent node of the leaf node; and using the difference as the value of the local increment of the feature corresponding to the parent node of the leaf node.

4. The computer-implemented method of claim 1, wherein the GBDT model is a classification model or a regression model.

5. A non-transitory, computer-readable medium storing one or more instructions executable by a computer system to perform one or more operations comprising:

generating a predicted label for a user using a gradient boosting decision tree GBDT model, the GBDT model comprising multiple decision trees arranged in a predetermined order;

obtaining, from each of a predetermined quantity of decision trees ranked among top decision trees, (i) a leaf node corresponding to the predicted label generated for the user and (ii) a score of the leaf node that is determined by using the GBDT model;

for each of the predetermined quantity of decision trees ranked among top decision trees:

determining a prediction path of the leaf node obtained from the decision tree, wherein the prediction path includes the leaf node, a root node of the decision tree in which the leaf node is included, and any child node included therealong that is neither the leaf node nor the root node;

computing, for the leaf node, a count of how many training samples for the GBDT model have the predicted label corresponding to the leaf node, wherein the count is dependent on a total quantity of training samples applied during a training process of the GBDT model;

determining, based on the count of training samples, a weight for the score of the leaf node;

determining an estimated score of a parent node of the leaf node based at least on multiplying the weight with the score of the leaf node;

obtaining a split feature corresponding to the parent node of the leaf node;

determining, for the leaf node and based on (i) the score of the leaf node, (ii) the estimated score of the parent node of the leaf node, and (iii) the split feature corresponding to the parent node of the leaf node, a feature corresponding to the leaf node and a local increment of the feature along the path from the parent node of the leaf node to the leaf node;

whenever the parent node is not the root node of the decision tree in which the leaf node is included, using the parent node of the leaf node as a child node and determining, for the child node and based on (i) an estimated score of the child node, (ii) an estimated score of a parent node of the child node, and (iii) a split feature corresponding to the parent node of the child node, a feature corresponding to the child node and a local increment of the feature along the path from the parent node of the child node to the child node; and obtaining a collection of features respectively corresponding to the child nodes including the leaf node as the multiple features relevant to the predicted label value of the user;

determining, from the collection of features that have been obtained for each of the predetermined quantity of decision trees, a set of child nodes that correspond to a same, first feature; and determining, by computing a sum of the local increments of the first feature, a measure of relevance between the first feature and the predicted label for the user.

6. The non-transitory, computer-readable medium of claim 5, further comprising determining the estimated score of the parent node of the leaf node based on:

determining an average value of respective scores of two child nodes of the parent node.

7. The non-transitory, computer-readable medium of claim 5, wherein determining the local increment of the feature along the path from the parent node of the leaf node to the leaf node comprises:

determining a difference between the score of the leaf node and the estimated score of the parent node of the leaf node; and using the difference as the value of the local increment of the feature corresponding to the parent node of the leaf node.

8. The non-transitory, computer-readable medium of claim 5, wherein the GBDT model is a classification model or a regression model.

9. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

generating a predicted label for a user using a gradient boosting decision tree GBDT model, the GBDT model comprising multiple decision trees arranged in a predetermined order;

obtaining, from each of a predetermined quantity of decision trees ranked among top decision trees, (i) a leaf node corresponding to the predicted label generated for the user and (ii) a score of the leaf node that is determined by using the GBDT model;

for each of the predetermined quantity of decision trees ranked among top decision trees:

determining a prediction path of the leaf node obtained from the decision tree, wherein the prediction path includes the leaf node, a root node of the decision tree in which the leaf node is included, and any child node included therealong that is neither the leaf node nor the root node;

computing, for the leaf node, a count of how many training samples for the GBDT model have the predicted label corresponding to the leaf node, wherein the count is dependent on a total quantity of training samples applied during a training process of the GBDT model;

determining, based on the count of training samples, a weight for the score of the leaf node;

determining an estimated score of a parent node of the leaf node based at least on multiplying the weight with the score of the leaf node;

obtaining a split feature corresponding to the parent node of the leaf node;

determining, for the leaf node and based on (i) the score of the leaf node, (ii) the estimated score of the parent node of the leaf node, and (iii) the split feature corresponding to the parent node of the leaf node, a feature corresponding to the leaf node and a local increment of the feature along the path from the parent node of the leaf node to the leaf node;

whenever the parent node is not the root node of the decision tree in which the leaf node is included, using the parent node of the leaf node as a child node and determining, for the child node and based on (i) an estimated score of the child node, (ii) an estimated score of a parent node of the child node, and (iii) a split feature corresponding to the parent node of the child node, a feature corresponding to the child node and a local increment of the feature along the path from the parent node of the child node to the child node; and obtaining a collection of features respectively corresponding to the child nodes including the leaf node as the multiple features relevant to the predicted label value of the user;

determining, from the collection of features that have been obtained for each of the predetermined quantity of decision trees, a set of child nodes that correspond to a same, first feature; and determining, by computing a sum of the local increments of the first feature, a measure of relevance between the first feature and the predicted label for the user.

10. The computer-implemented system of claim 9, further comprising determining the estimated score of the parent node of the leaf node based on:
    determining an average value of respective scores of two child nodes of the parent node.

11. The computer-implemented system of claim 9, wherein determining the local increment of the feature along the path from the parent node of the leaf node to the leaf node comprises:
    determining a difference between the score of the leaf node and the estimated score of the parent node of the leaf node; and
    using the difference as the value of the local increment of the feature corresponding to the parent node of the leaf node.

12. The computer-implemented system of claim 9, wherein the GBDT model is a classification model or a regression model.

13. The computer-implemented method of claim 1, wherein determining the estimated score of the parent node of the leaf node comprises:
    computing, for another leaf node of the parent node of the leaf node, a count of how many training samples for the GBDT model have the predicted label corresponding to the other leaf node;
    determining, based on the count of training samples, another weight for the score of the other leaf node; and
    determining the estimated score of the parent node of the leaf node based on multiplying the weight with the score of the leaf node and on multiplying the other weight with a score of the other leaf node that is determined by using the GBDT model.

14. The computer-implemented method of claim 1, wherein the first feature is one of multiple features associated with the user for whom the predicted label has been generated using the GBDT model.

* * * * *